US005750888A

United States Patent [19]

Matsumoto et al.

[11] Patent Number: 5,750,888

[45] Date of Patent: May 12, 1998

[54] FAULT DIAGNOSTIC METHOD AND APPARATUS FOR FUEL EVAPORATIVE EMISSION CONTROL SYSTEM

[75] Inventors: Takuya Matsumoto; Toru Hashimoto; Mitsuhiro Miyake; Hitoshi Kamura, all of Kyoto; Toshiro Nomura, Okazaki, all of Japan

[73] Assignee: Mitsubishi Jidosha Kogyo Kabushi Kaisha, Tokyo, Japan

[21] Appl. No.: 683,415

[22] Filed: Jul. 18, 1996

[30] Foreign Application Priority Data

Jul. 21, 1995 [JP] Japan .................................... 7-185975

[51] Int. Cl.$^6$ .......................... F02M 25/08; G01M 15/00

[52] U.S. Cl. .............................................. 73/118.1; 73/49.7

[58] Field of Search ......................... 73/49.7, 116, 117.2, 73/117.3, 118.1; 123/518, 519, 520; 364/431.05, 431.06

[56] References Cited

U.S. PATENT DOCUMENTS

| | | | |
|---|---|---|---|
| 5,150,689 | 9/1992 | Yano et al. | 123/519 |
| 5,191,870 | 3/1993 | Cook | 123/520 |
| 5,193,512 | 3/1993 | Steinbrenner et al. | 123/519 |
| 5,245,973 | 9/1993 | Otsuka et al. | 123/519 |
| 5,261,379 | 11/1993 | Lipinski et al. | 123/520 |
| 5,372,036 | 12/1994 | Kainz | 73/117.3 |
| 5,398,662 | 3/1995 | Igarashi et al. | 123/520 |
| 5,408,866 | 4/1995 | Kawamura et al. | 73/49.7 |
| 5,425,344 | 6/1995 | Otsuka et al. | 123/520 |
| 5,445,015 | 8/1995 | Namiki et al. | 73/118.1 |
| 5,490,414 | 2/1996 | Durschmidt et al. | 73/118.1 |
| 5,495,749 | 3/1996 | Dawson et al. | 73/118.1 |
| 5,507,176 | 4/1996 | Kammeraad et al. | 73/49.7 |
| 5,575,267 | 11/1996 | Matsumoto et al. | 123/519 |

FOREIGN PATENT DOCUMENTS 9112426 8/1991 WIPO .

*Primary Examiner*—George M. Dombroske

[57] ABSTRACT

A method and apparatus for detecting faults in a fuel evaporative emission control system, in which the fuel evaporative emission which is admitted from a fuel tank and adsorbed once by a canister is separated from the canister by purge air and sucked into a suction passage of an engine. The fault diagnostic apparatus fluid-tightly closes the fuel tank such that a vacuum is held in the fuel tank, and then detect the presence of a leak in a fuel evaporative emission flow path on the basis of a rate of increase of the pressure in the fuel tank. At the same time, the average value of the pressure in the fuel tank is calculated at regular intervals, and the calculated average value is compared with levels of the pressure in the tank detected within a predetermined period of time, so that the detection of the leak is interrupted depending upon the result of the comparison.

27 Claims, 9 Drawing Sheets

FAULT DIAGNOSTIC METHOD AND APPARATUS FOR FUEL EVAPORATIVE EMISSION CONTROL SYSTEM

BACKGROUND OF THE INVENTION

1. Field of the Invention

The present invention relates to a fault diagnostic method and apparatus for diagnosing faults of a fuel evaporative emission control system for inhibiting a fuel evaporative emission from exhausting, and is particularly concerned with a technique of preventing an error in the diagnosis during turning of a running vehicle, for example.

2. Discussion of Related Art

Various devices for treating harmful exhausted components are installed on an engine or vehicle body of an automobile, for such purposes as preventing or controlling air pollution. For instance, blowby gas containing an unburned fuel component (HC: hydrocarbon) as a major component, which leaks from a combustion chamber into a crankcase, is drawn in an intake manifold of the engine by means of a blowby gas circulating apparatus, and is burnt together with new air. A gasoline vapor generated in a fuel tank, namely, a fuel evaporative emission (hereinafter referred simply as evaporative emission) containing HC as a major component, is drawn into the intake manifold through a fuel evaporative emission control system for inhibiting the evaporative emission from exhausting, and is burnt together with the new air, as in the case of the blowby air.

The fuel evaporative emission control system consists of a canister filled with activated charcoal for adsorbing the evaporative emission, and numerous pipes and others. The canister is provided with an inlet port communicating with the fuel tank, an outlet or discharge port communicating with the intake manifold, and a vent port that is open to the atmosphere. In the fuel evaporative emission control system of this canister storage type, the evaporative gas emission in the fuel tank is drawn into the canister and adsorbed by the activated charcoal in the canister. The vacuum of the intake manifold is then applied to the discharge port while the engine is driven in a given operating condition, so that the atmosphere (purge air) is introduced into the canister through the vent port. As a result, the evaporative emission adsorbed by the activated charcoal is separated from the activated charcoal due to the purge air, and the separated emission is then introduced into the intake manifold along with the purge air. The evaporative emission drawn in the intake manifold is burnt in the combustion chamber of the engine together with an air-fuel mixture, and is thus prevented from being dissipated or discharged to the ambient atmosphere.

In the above fuel evaporative emission control system, a vapor pipe communicating with the fuel tank and the canister, and a purge pipe communicating with the canister and the intake manifold are generally formed from steel pipes or rubber hoses. After running the automobile for a long-period, therefore, these pipes may suffer from holes formed due to corrosion and/or cracks formed due to degradation, even if the pipes are treated in advance against rust and degradation. In this case, the interior of the vapor pipe or purge pipe is brought into communication with the atmosphere through the holes or cracks. This may cause a substantial amount of the evaporative emission to be discharged into the ambient atmosphere as an increasing amount of the evaporative emission is generated in the fuel tank when the automobile is parked under the blazing sun, for example. Similar problems may occur where cracks or the like are formed in the canister when hit by stones or damaged in a collision accident. Even if the evaporative emission is discharged into the atmosphere, however, the engine operates normally without suffering from any trouble, and the driver is thus hardly aware of the fault, thereby leaving the evaporative emission discharged into the atmosphere over a long period of time.

In view of the above situation, there has been proposed an onboard diagnostic apparatus for diagnosing such faults, which has a relatively simple structure and is able to detect leaks in the pipes and canister. This apparatus includes solenoid valves that are driven by an ECU (electronic control unit) and provided in the vicinity of the vent port of the canister and the inlet port of the intake manifold, and a pressure sensor provided at the upper surface of the fuel tank for outputting detected signal to the ECU, and is adapted to detect leaks on the basis of a variation in the internal pressure of the fuel tank under certain conditions. More specifically, after the solenoid valve on the side of the vent port is closed for a given period of time during engine operation, the solenoid valve on the side of the intake manifold is also closed so as to hold a vacuum in the fuel tank. The presence of a leak is then determined when a rate of subsequent increase of the pressure in the tank exceeds a predetermined threshold. Although the internal pressure of the fuel tank gradually increases as the evaporative emission is generated even in the absence of the leak, the internal pressure rapidly increases in a short time due to the atmosphere drawn into the tank if the leak is present in the pipe or canister, thus enabling detection of the presence of a hole or crack.

The known fault diagnostic apparatus as described above has the following problems. In the case where the fuel has a high liquid level in the fuel tank immediately after fueling, for example, the fuel may intrude into a mounting hole of the pressure sensor if the fuel liquid level inclines or ruffles due to accelerated or decelerated running or turning of the vehicle. In such a case, the air (evaporative emission) in the mounting hole is compressed by the fuel, with a result of an increase in the detected value of the pressure sensor even when the internal pressure in the fuel tank is actually held at a low level. As a result, the ECU determines the presence of a leak in the pipe or canister, and turns on a warning lamp or record a fault code in diagnostic data, thus requiring unnecessary maintenance and repair.

OBJECT AND SUMMARY OF THE INVENTION

The present invention has been developed in the light of the above-described situation. It is therefore an object of the invention to provide a fault diagnostic method and apparatus for a fuel evaporative emission control system, which prevents an error in the fault detection due to an inclined liquid level of the fuel in the fuel tank.

The above object may be accomplished according to the principle of the present invention, which provides a fault diagnostic apparatus for detecting faults of a fuel evaporative emission control system for inhibiting a fuel evaporative emission from exhausting, the control system including a fuel evaporative emission flow path for drawing the fuel evaporative emission in a fuel tank into a suction passage of an engine, comprising: path closure means for closing the flow path such that a vacuum is held in said fuel tank, said path closure means being provided in the fuel evaporative emission flow path; internal pressure detecting means for detecting a level of internal pressure in the fuel tank; leak detecting means for detecting a leak in the fuel evaporative emission flow path; average calculating means for calculating an average value of detected levels of the internal pressure obtained by the internal pressure detecting means within a predetermined period of time; comparing means for comparing each of the detected levels obtained by the internal pressure detecting means with the average value; and detection interrupting means for interrupting detection by the leak detecting means depending upon a result of comparison by the comparing means.

According to the present invention, even if the fuel evaporative emission leaks through a defect formed in the fuel evaporative emission flow path, the leak detecting means is able to detect the leak on the basis of levels detected by the internal pressure detecting means. In particular, the detection interrupting means interrupts the detection effected by the leak detecting means, depending upon the result of comparison by the comparing means that compares the levels detected by the internal pressure detecting means with the average value obtained by the average calculating means. It is therefore possible to prevent errors in the fault detection even if the liquid level of the fuel in the fuel tank is inclined or ruffles due to vibrations or acceleration during running of the vehicle, and the pressure level of the fuel tank temporarily fluctuates due to the inclined or ruffling fuel liquid level.

In one preferred form of the invention, the comparing means calculates a deviation of each of the detected levels of the internal pressure from the average value, so that the detection interrupting means can interrupt or halt the detection by the leak detecting means, depending upon a magnitude of the deviation.

In another preferred form of the invention, the leak detecting means determines that the leak is present in the fuel evaporative emission flow path when a rate of increase of the detected levels of the internal pressure exceeds a predetermined threshold. The rate of increase of the detected levels may be determined on the basis of a variation in the internal pressure within a predetermined period of time, or on the basis of a period of time required to achieve a predetermined amount of variation in the internal pressure.

In a further preferred form of the invention, the average calculating means repeatedly calculates the average value at predetermined time intervals, so as to achieve improved detecting accuracy.

A fuel evaporative emission adsorbing means, such as a canister, may be positioned in the fuel evaporative emission flow path.

DETAILED DESCRIPTION OF THE INVENTION

A preferred embodiment of a fault diagnostic method and apparatus of the present invention will be described in detail with reference to the accompanying drawings.

Figure 1:
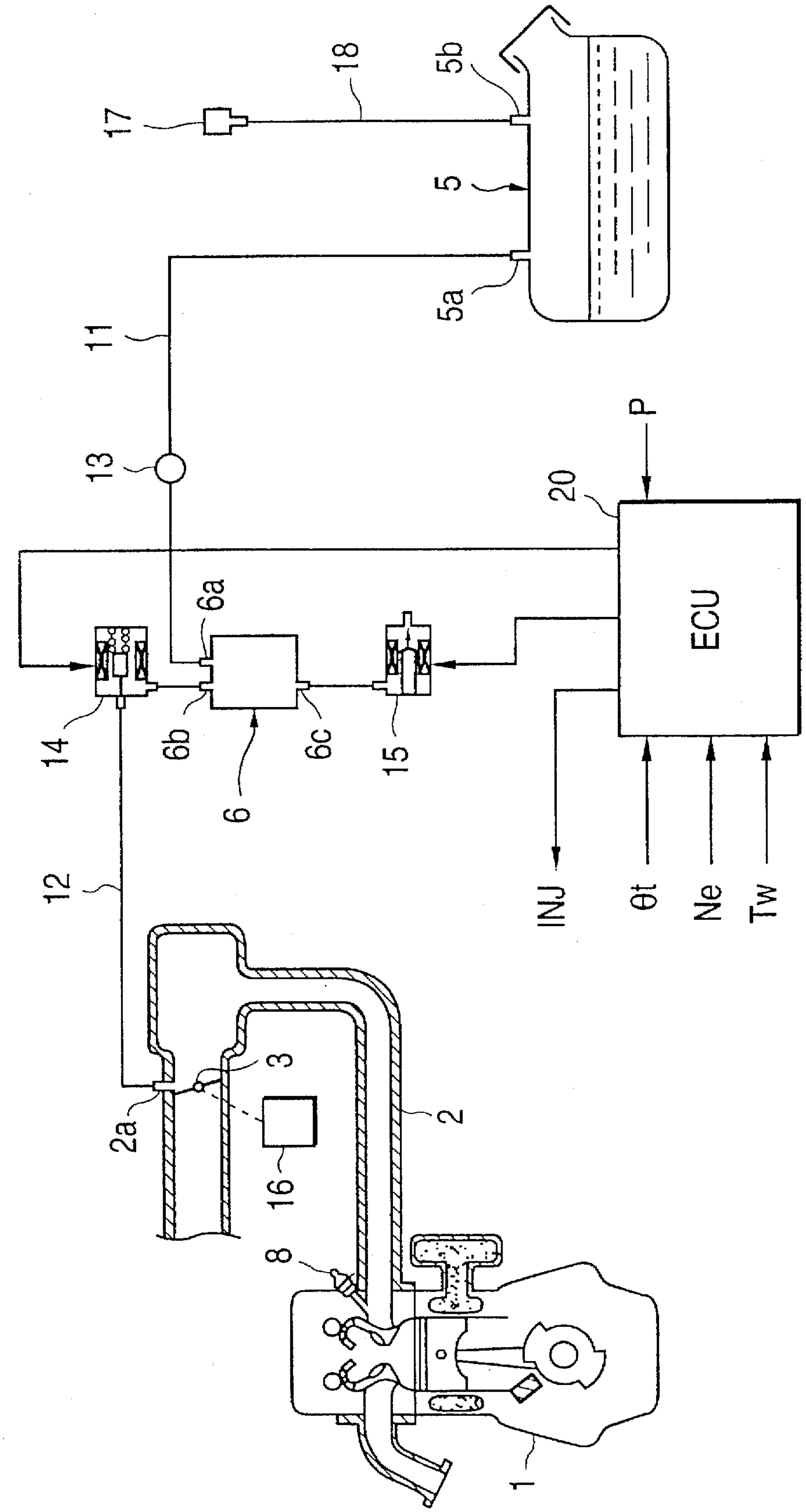
FIG. 1 is a schematic view showing the construction of the fuel evaporative emission control system according to the present invention.

FIG. 1 is a view schematically showing a fuel evaporative emission control system for inhibiting or suppressing exhaust of a fuel evaporative emission. In this figure, reference numeral 1 denotes a fuel injection gasoline engine (hereinafter referred simply as "engine") for an automobile. A purge port *2a* is formed through a wall of an intake manifold 2 of the engine 1 at a position adjacent to a throttle valve 3, so that a vacuum in the intake manifold 2 is applied to the purge port *2a* when the throttle valve 3 is opened by a predetermined degree of opening or further. The purge port *2a* is connected to an outlet port *6b* of a canister 6, through a purge path 12. At the upper surface of a fuel tank 5, there are formed a vent port *5a* communicating with an evaporative emission inlet port *6a* of the canister 6 through a vent path 11, and an internal pressure detecting port 5b connected to a pressure sensor 17 through an internal pressure feed path 18.

A check valve 13 for inhibiting excessive fueling is installed halfway in the vent path 11, and a purge solenoid valve 14 is installed halfway in the purge path 12. The canister 6 has a vent port *6c* which communicates with the atmosphere through a vent solenoid valve 15. The purge solenoid valve 14, which is a normally closed type solenoid valve, closes the purge path 12 when it is de-energized, and opens the purge path 12 when energized. The vent solenoid valve 15, which is a normally open type solenoid valve, vents the vent port *6c* to the atmosphere when it is de-energized, and closes the vent port *6c* when energized. The canister 6 contains activated charcoal for adsorbing an evaporative emission in the fuel tank 5, which is introduced into the canister 6 through the vent path 11. The adsorbed evaporative emission is fed to the intake manifold 2 through the purge path 12, together with purge air entering through the atmosphere port *6c*, due to the suction vacuum generated upon energization of the purge solenoid valve 14.

The throttle valve 3 is provided with a throttle sensor 16 adapted to output a signal corresponding to a degree of opening θt of the throttle valve 3. The pressure sensor 17 serves to detect the pressure P of the evaporative emission in the fuel tank 5 through the internal pressure feed path 18, and output a signal corresponding to the pressure P. The engine 1 is provided with an air flow sensor for measuring the amount of intake air, an engine speed sensor for detecting the engine speed rpm Ne, a water temperature sensor for detecting the water temperature Tw of the engine, and others. These sensors are not shown in FIG. 1. Numerous sensors including the throttle sensor 16, pressure sensor 17, air flow sensor, engine speed sensor, and water temperature sensor, as well as actuators, such as an injector 8 installed on the intake manifold 2, purge solenoid valve 14 and vent solenoid valve 15, are connected to an ECU (electronic control unit) 20.

The ECU 20 receives signals, such as, θt, Ne, Tw from the throttle sensor 16, engine speed sensor, and water temperature sensor, respectively, and a signal representing the quantity of the intake air from the air flow sensor, and calculates the fuel injection quantity suitable for a desired operating condition of the engine 1, so as to drive or operate the injector 8 to inject the fuel to each of cylinders. The ECU 20 is also adapted to energize the purge solenoid valve 14 to open this valve depending upon the current operating condition of the engine, in response to signals received from the engine speed sensor and air flow sensor, so as to introduce the evaporative emission adsorbed in the canister 6 and the purge air into the intake manifold 2 so that the emission is burned together with the fuel injected from the injector 8. Further, the ECU 20 detects any fault of the evaporative emission control system for inhibiting the evaporative emission from exhausting, and turns on and off an alarm lamp (not shown) depending upon the result of the detection. The alarm lamp may be provided on an instrument panel (not shown) or the like, so that the driver can easily recognize the information given by the alarm lamp.

There will be hereinafter explained the process of detecting faults of the evaporative emission control system.

The fault detecting process according to the present embodiment is implemented when the engine is operated with a large amount of the intake air, so as to minimize a variation in the air/fuel ratio due to the evaporative emission drawn in the intake manifold. In this manner, it can be confirmed that the evaporative emission is being introduced through the purge port 2*a*, and the fluctuation in the engine output torque can be suppressed or reduced. In the present embodiment, the degree of opening of the throttle valve 3 is used as a basis for determining whether the engine is in such an operating condition that permits the fault detecting process to be carrier out. Namely, the fault detection is effected only when the throttle opening exceeds a predetermined value. The engine operating condition suitable for the fault detection may be determined on the basis of the amount of the intake air measured by the air flow sensor, instead of the throttle position.

Figures 2A, 2B, 2C, 2D:
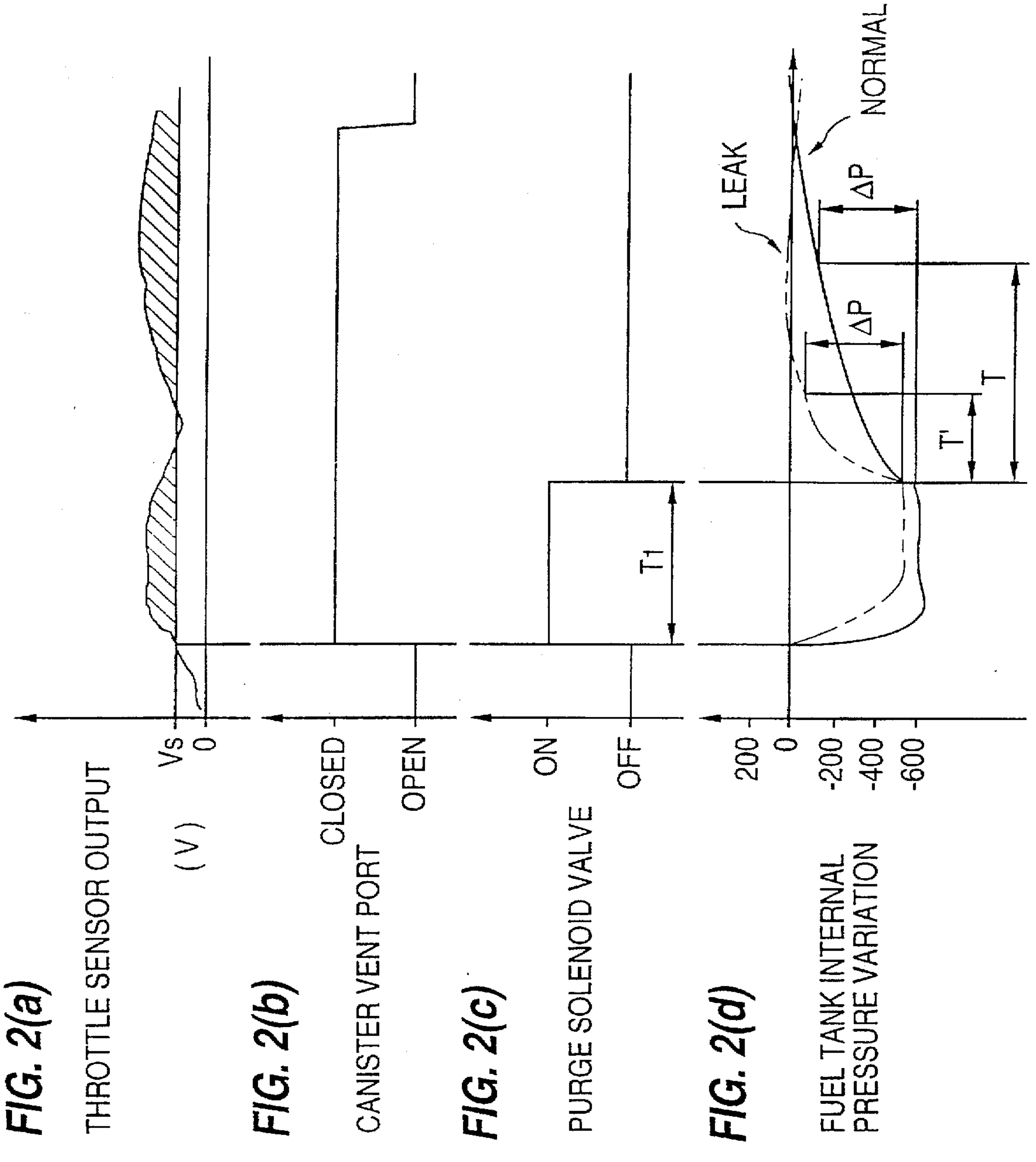
FIG. 2 is a time chart showing variations of parameters related to the fault detection with respect to time.

When the solenoid valves 14, 15 in FIG. 1 are de-energized, the purge path 12 is closed, and the vent port 6*c* of the canister 6 is open to the atmosphere, thus making the internal pressure of the fuel tank 5 to be substantially equal to the atmospheric pressure. In this state, if the opening angle of the throttle valve 3 exceeds a predetermined degree, that is, if the output Vt of the throttle sensor 16 exceeds a predetermined value Vs in FIG. 2 (*a*), the vent solenoid valve 15 is energized to close the vent port 6*c* of the canister 6 as shown in FIG. 2(*b*). At the same time, the purge solenoid valve 14 is energized for a predetermined time T1 as shown in FIG. 2(*c*), so that the outlet port 6*b* of the canister 6 communicates with the intake manifold 2. Since a vacuum is applied to the intake manifold 2, the evaporative emission adsorbed by the canister 6 is sucked into the intake manifold 2. At the same time, the internal pressure of the canister and the fuel tank 5 is lowered down to a level that is substantially equal to the vacuum of the engine, as the vent port 6*c* of the canister 6 is closed.

When the purge solenoid valve 14 is de-energized after the lapse of the predetermined time T1, the outlet port 6*b* of the canister 6 is closed so that the vacuum is held in the canister 6 and the fuel tank 5. With the fuel tank 5 holding the vacuum, evaporation of the fuel is accelerated in the fuel tank 5, and the internal pressure of the fuel tank 6 is gradually increased. Therefore, if there is no leak in the evaporative emission control system consisting of the fuel tank 5, vent path 11, purge path 12, canister 6 and others, the internal pressure of the fuel tank 5 gradually increases as indicated by a solid line in FIG. 2(*d*), requiring a relatively long time T to be taken until a variation ΔP in the internal pressure reaches a predetermined value Ps.

If, however, there is any leak in the evaporative emission control system, e.g., if a corrosion hole is present in a steel pipe or the like that defines the vent path 11, the air is sucked in through the corrosion hole, and the internal pressure of the fuel tank 5 increases relatively rapidly as indicated by a two-dot chain line in FIG. 2(*d*), requiring a shorter period of time T' than the above-indicated time T to be taken from the time when the purge solenoid valve 14 is closed to the time when the variation ΔP in the internal pressure of the fuel tank 5 reaches the predetermined value Ps. Thus, the presence or absence of any fault of the evaporative emission control system can be determined by measuring the duration from the time when the purge solenoid valve 14 is closed until the time when the pressure increase ΔP in the fuel tank 5 reaches the predetermined value Ps. The ECU 20 determines the presence or absence of any fault of the system by measuring the time taken until the variation ΔP in the internal pressure of the fuel tank 5 reaches the predetermined value Ps to detect any leakage of the evaporative emission, and turns on the alarm lamp to inform the driver of the abnormality to urge repair. It is to be understood that the fault due to the leakage of the evaporative emission remains present until it is removed, making it unnecessary to repeat the fault detecting process once the alarm lamp is turned on upon determination of the presence of the fault.

Referring next to flow charts of FIGS. 3 and 4, there will be explained the routine of detecting faults according to the present embodiment. The routine of detecting faults of the evaporative emission control system will be described referring to steps S1, S17 through S23 of FIG. 3, and the routine of creating an initial condition for the fault detection will be described referring to steps S2 through S16 of FIG. 4.

Figure 3:
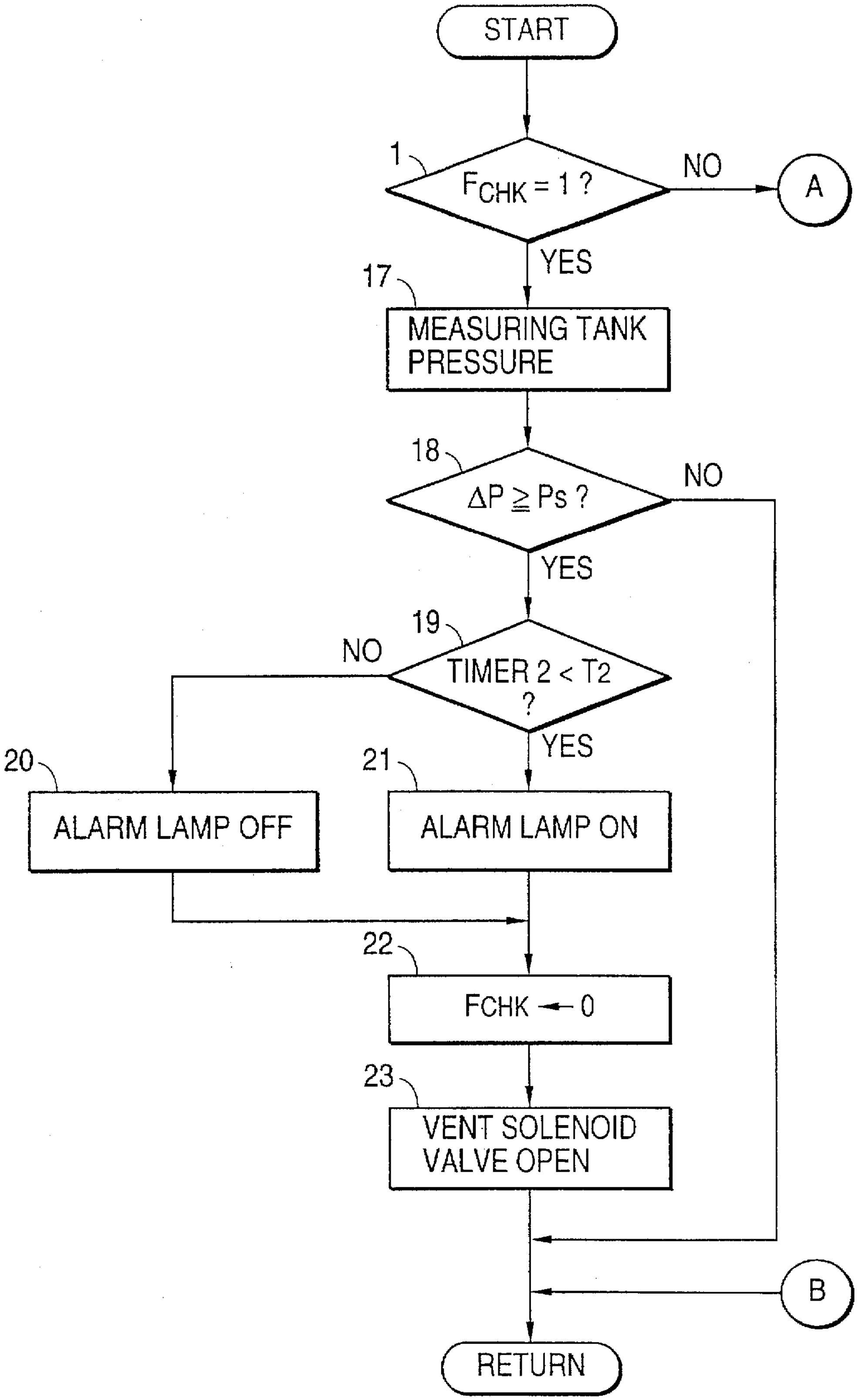
FIG. 3 is a flow chart showing the routine of detecting faults of the evaporative emission control system of FIG. 1.
Figure 4:
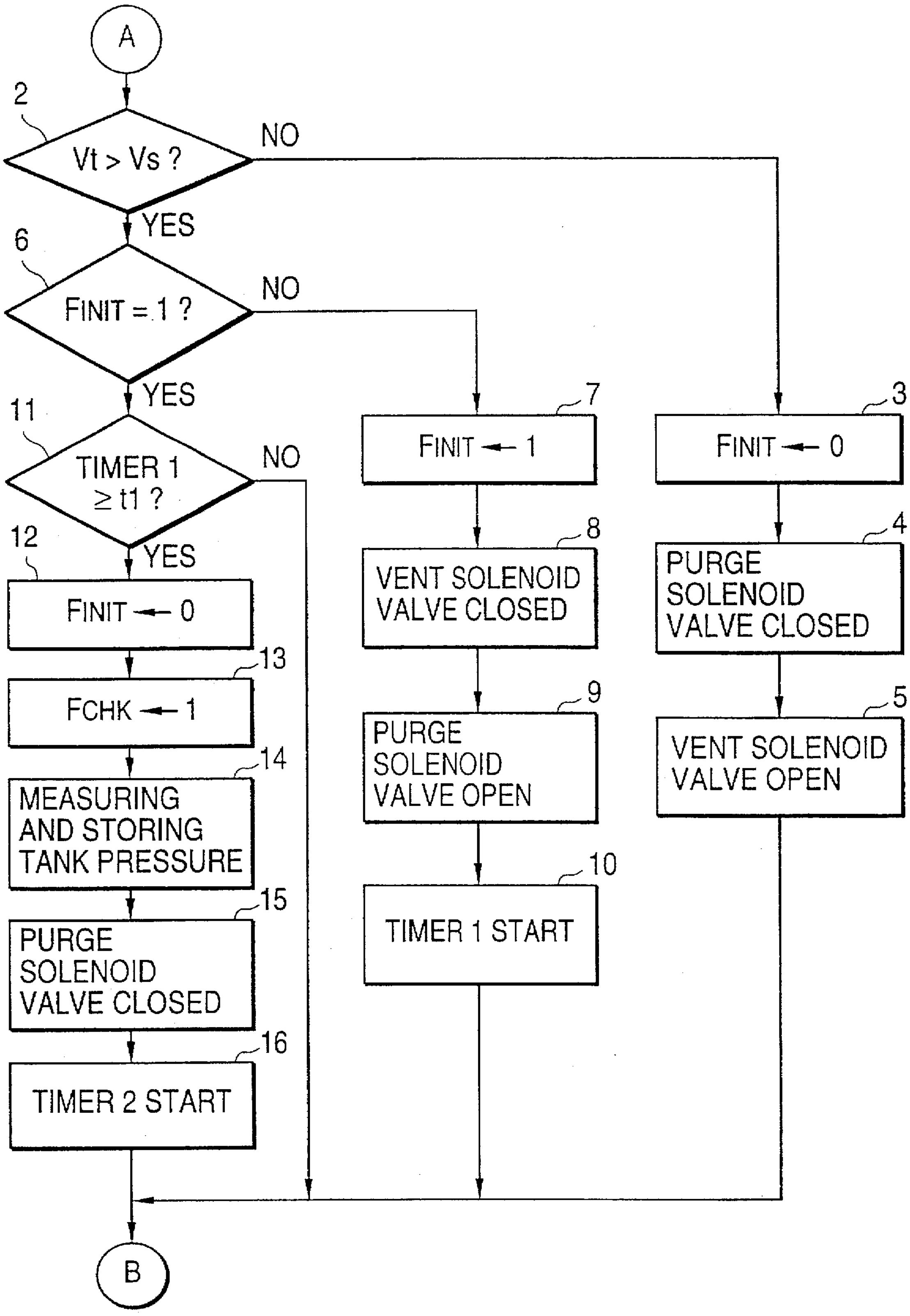
FIG. 4 is a flow chart showing the fault detecting routine.

When an ignition key of the automobile is turned on to start the engine 1, the ECU 20 implements a fault detection subroutine shown in the flow charts of FIGS. 3 and 4 at a predetermined control interval. Once this subroutine is started, the ECU 20 initially determines in step S1 whether or not the value of a check flag ($F_{CHK}$) is "1" that indicates that the fault detection can be carried out. In the initial cycle of the subroutine, the check flag $F_{CHK}$ is set to "0", and a negative decision (NO) is obtained in step S1. In the next step S2, the ECU 20 determines whether the output Vt of the throttle sensor 16 exceeds the predetermined value Vs (Vt>Vs) or not, in other words, whether the throttle opening angle is equal to or larger than the predetermined degree. If a negative decision (NO) is obtained in step S2, an initial flag $F_{INIT}$ is set to 0 in step S3 of FIG. 4, followed by step S4 in which the purge solenoid valve 14 is closed so as to close the purge path 12 and inhibit the evaporative emission from entering the intake manifold 2. In the next step S5, the ECU 20 opens the vent solenoid valve 15 so that the vent port 6*c* of the canister 6 is exposed to the atmosphere, causing the evaporative emission control system to return to its normal state. The current control cycle is then terminated and the control flow goes back to step S1.

In the following control cycle, a negative decision (NO) is obtained in step S1 since the value of the check flag $F_{CHK}$ remains "0" at this point of time, and the ECU 20 then executes step S2. If an affirmative decision (YES) is obtained in step S2, namely, if the output Vt of the throttle sensor 16 is larger than the predetermined value Vs in FIG. 2 (*a*), the ECU 20 determines in step S6 whether the value of the initial flag $F_{INIT}$ is "1" or not. A negative decision (NO) is obtained in step S6 as the initial flag $F_{INIT}$ has been set to "0" in step S3. The ECU 20 then executes step S7 to set the initial flag $F_{INIT}$ to "1".

Subsequently, the ECU 20 energizes the vent solenoid valve 15 in step S8 to close the vent port 6*c* as shown in FIG. 2(*b*), and at the same time energizes the purge solenoid valve 14 in step S9 as shown in FIG. 2(*c*) so as to communicate the outlet port 6*b* of the canister 6 with the intake manifold 2. Thereafter, a timer 1 is started in step S10, and the control flow goes back to step S1. The timer 1 is provided for setting a period of time T1 for which the purge solenoid valve 14 is held open to build a sufficient negative pressure or vacuum within the fuel tank 5. Consequently, the evaporative emission in the canister 6 is drawn into the intake manifold 2, and the internal pressure of the canister 6, vent path 11, purge path 12 and fuel tank 5 is lowered down to a level that is substantially equal to the vacuum of the intake manifold 2, as shown in FIG. 2(*d*).

Figures 5A, 5B, 5C:
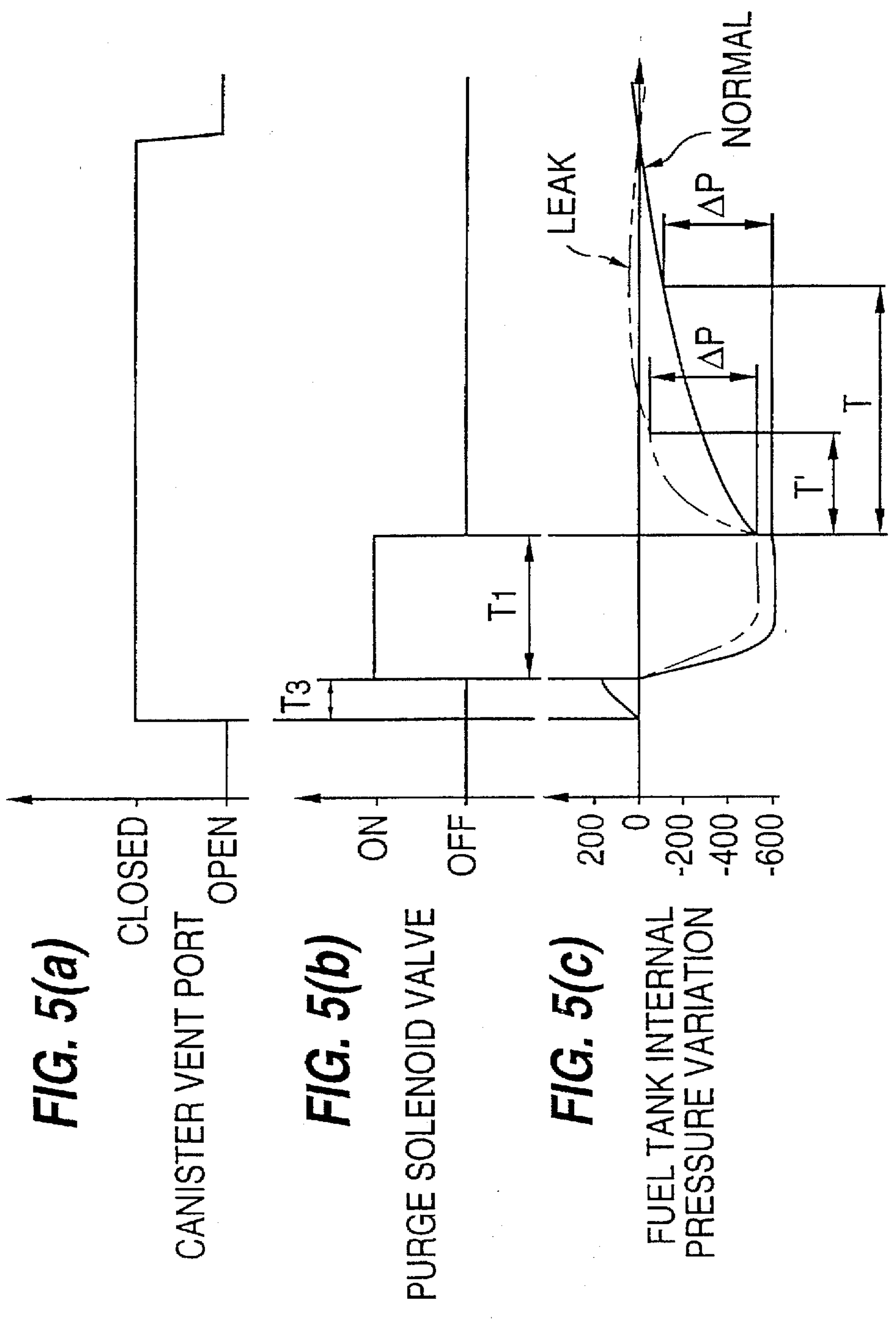
FIG. 5 is a time chart showing timewise variations of parameters related to a modified example of the fault detecting routine.
Figure 6:
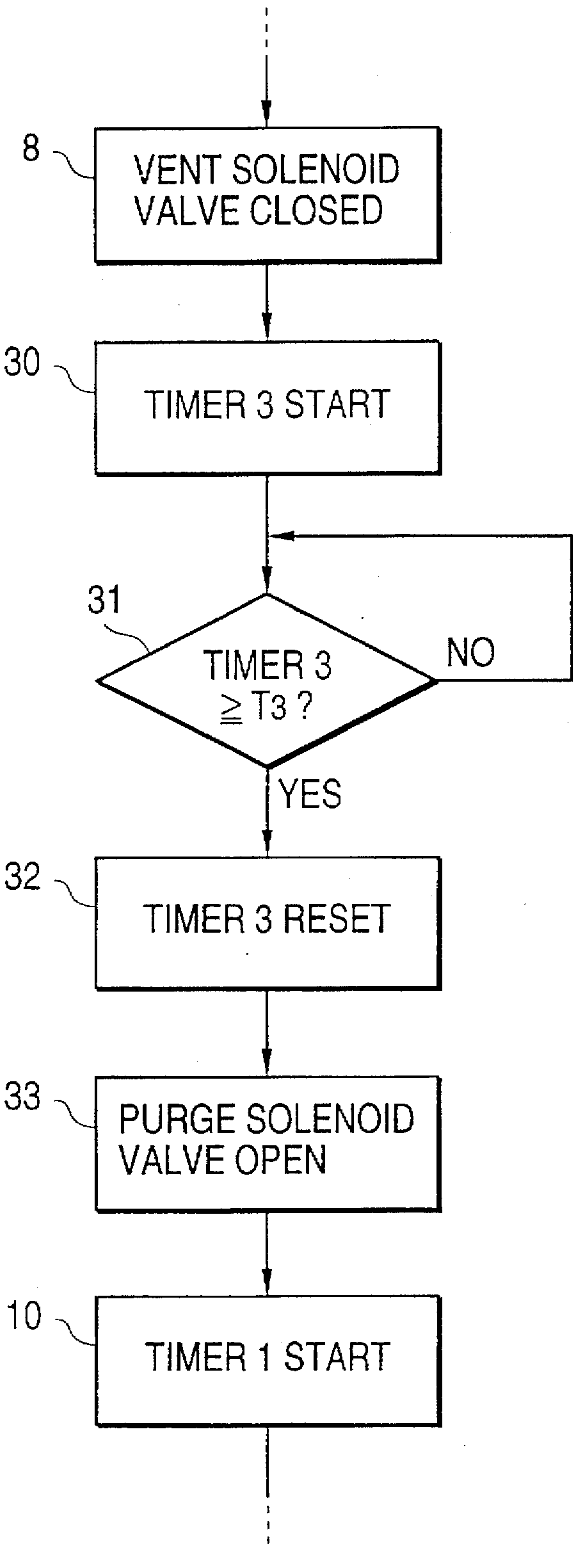
FIG. 6 is a flow chart showing a modified example of a part of the fault detecting routine.

Another process shown in FIGS. 5 and 6 may be employed for producing the vacuum in the fuel tank 5. Referring to the flow chart of FIG. 6, the ECU 20 energizes the vent solenoid valve 15 to close the vent port 6*c* of the canister 6 in step S8 as shown in FIG. 5(*a*), and starts a timer 3 in step S30. In the next step S31, the ECU 20 determines whether the time counted by the timer 3 becomes equal to or greater than a predetermined time T3 (e.g., ten to twenty seconds) or not. If an affirmative decision (YES) is obtained in step S31, the timer 3 is reset in step S32, and the purge solenoid valve 14 is energized in step S33 so as to communicate the outlet port 6*b* of the canister 6 with the intake manifold 2, as shown in FIG. 5(*b*), followed by step S10 in which the timer 1 is started. In this manner, the internal pressure of the fuel tank 5 increases for the purpose of initialization while the predetermined time T3 elapses after closure of the vent port 6*c*, whereby any leak can be detected with improved accuracy.

Even when the vacuum is produced in the fuel tank 5, the value of the check flag $F_{CHK}$ remains "0" and a negative decision (NO) is obtained in step S1. Accordingly, the ECU 20 executes step S2, and, if an affirmative decision (YES) is obtained in step S2, the ECU 20 executes step S6 in which an affirmative decision (YES) is obtained, since the initial flag $F_{INT}$ is set to "1" in step S7. Subsequently, the ECU 20 determines in step S11 whether the time measured by the timer 1 exceeds the predetermined time T1 or not, and, if a negative decision (NO) is obtained in this step, returns to step S1 to repeat the above steps. When an affirmative decision (YES) is obtained in step S11, namely, if the pressure in the fuel tank 5 is sufficiently lowered down to a level of the vacuum of the engine, the initial flag $F_{INIT}$ is reset to "0" in step S12, and the check flag $F_{CHK}$ is set to "1" in step S13 so as to measure a variation in the internal pressure of the fuel tank 5.

The ECU 20 measures the internal pressure of the fuel tank 5 on the basis of an input signal from the pressure sensor 17, and stores the measured pressure in step S14. Thereafter, the ECU 20 closes the purge solenoid valve 14 in step S15, starts a timer 2 in step S16, and then returns to step S1. The internal pressure of the fuel tank 5 stored in the above step S14 provides a basis on which a variation or pressure rise ΔP is calculated. The timer 2 is adapted to measure the time required for the variation ΔP of the internal pressure of the fuel tank 5 to reach the predetermined value Ps. In this manner, the initial condition for detecting a leak in the evaporative emission control system is established according to the process of steps S2 through S16.

In the subsequent control cycle, an affirmative decision (YES) is obtained as the check flag $F_{CHK}$ has been set to "1" in step S13, and the ECU 20 starts measurement of the internal pressure of the fuel tank 5 on the basis of signals received from the pressure sensor 17 in step S17. The ECU 20 then determines in step S18 whether the variation ΔP of the internal pressure is equal to or greater than the predetermined value PS (ΔP ≧Ps) or not, and returns to step S1 to repeat the above steps if a negative decision (NO) is obtained in step S18. When an affirmative decision (YES) is obtained in step S18, step S19 is executed to determine whether the time measured by the timer 2 is shorter than a predetermined time T2 or not. If a negative decision (NO) is obtained in step S19, the ECU determines that the evaporative emission control system is in a normal condition, and the alarm lamp is held in an OFF state or turned off in step S20, followed by step S22 in which the check flag $F_{CHK}$ is reset to "0". Thereafter, the vent solenoid valve 15 is opened in step S23 to communicate the vent port 6*c* of the canister 6 with the atmosphere, as shown in FIG. 2(*b*), and the fault detection is thus terminated.

If an affirmative decision (YES) is obtained in step S19, namely, if the time T required for the variation ΔP of the internal pressure of the fuel tank 5 to increase up to the predetermined value Ps is shorter than the predetermined time T2, the ECU 20 determines that a leak is present in the fuel evaporative emission control system. After the alarm lamp is turned on in step S21 to inform the driver of the fault, steps S22 and S23, as described above, are executed and the fault detecting process is terminated. The alarm allows the driver to be aware of the occurrence of the fault in the evaporative emission control system, and to take necessary actions without delay.

Figure 7:
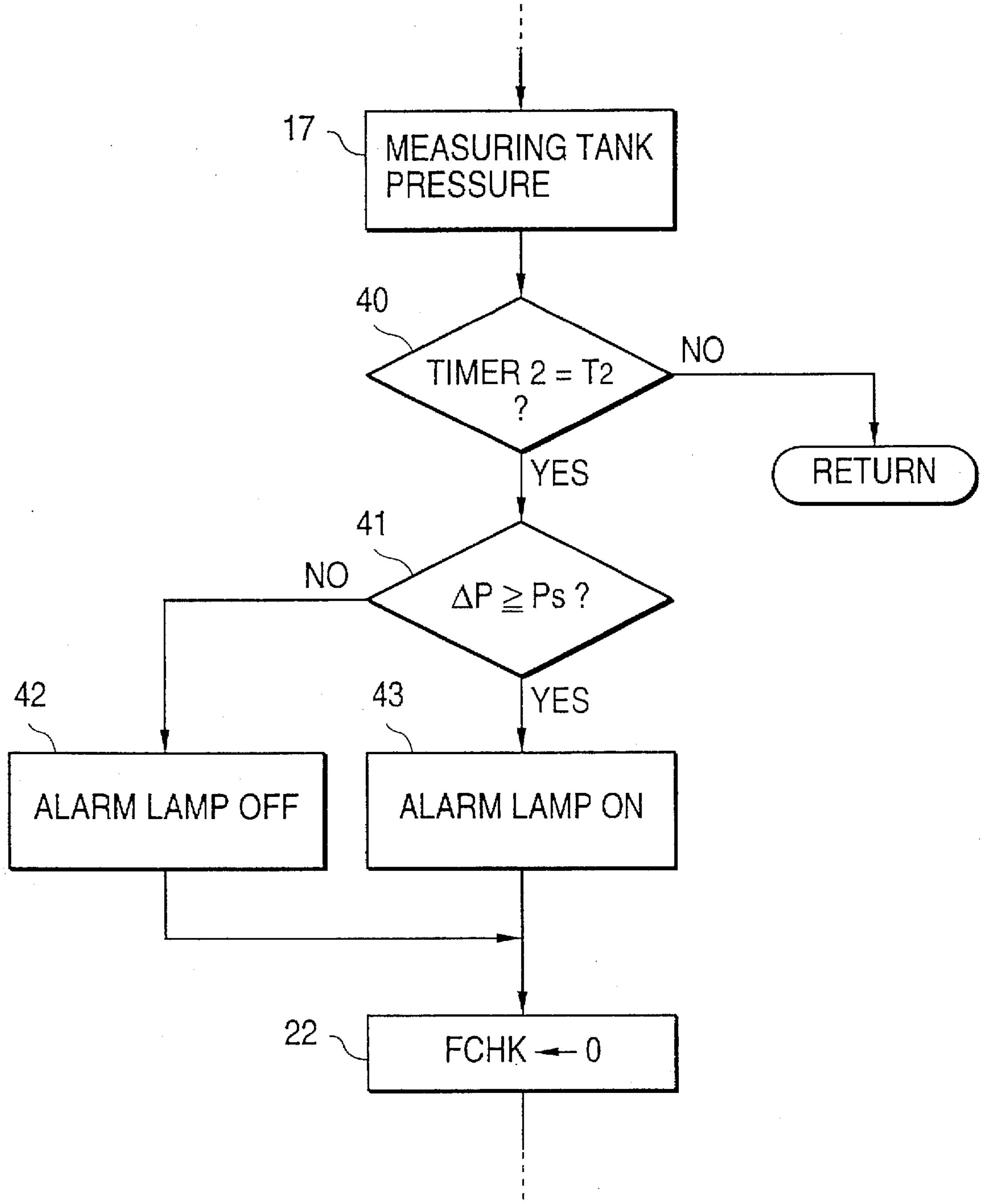
FIG. 7 is a flow chart showing a modified example of a part of the fault detecting routine.

The presence of a leak in the evaporative emission control system may also be determined according to another process as shown in the flow chart of FIG. 7. After the measurement of the internal pressure of the fuel tank 5 is initiated in step S17, the ECU 20 determines in step S40 whether the time measured by the timer 2 becomes equal to the predetermined time T2 or not. When an affirmative decision is obtained in step S40, the internal pressure of the fuel tank 5 is measured at this point of time, and step S41 is executed to determine whether the variation ΔP of the internal pressure is equal to or greater than the predetermined value Ps or not. The ECU turns off the alarm lamp in step S42 if a negative decision (NO) is obtained in step S41, and turns on the alarm lamp in step S43 if an affirmative decision (YES) is obtained in step S41. Thereafter, the check flag $F_{CHK}$ is reset to "0" in step S22.

Figure 8:
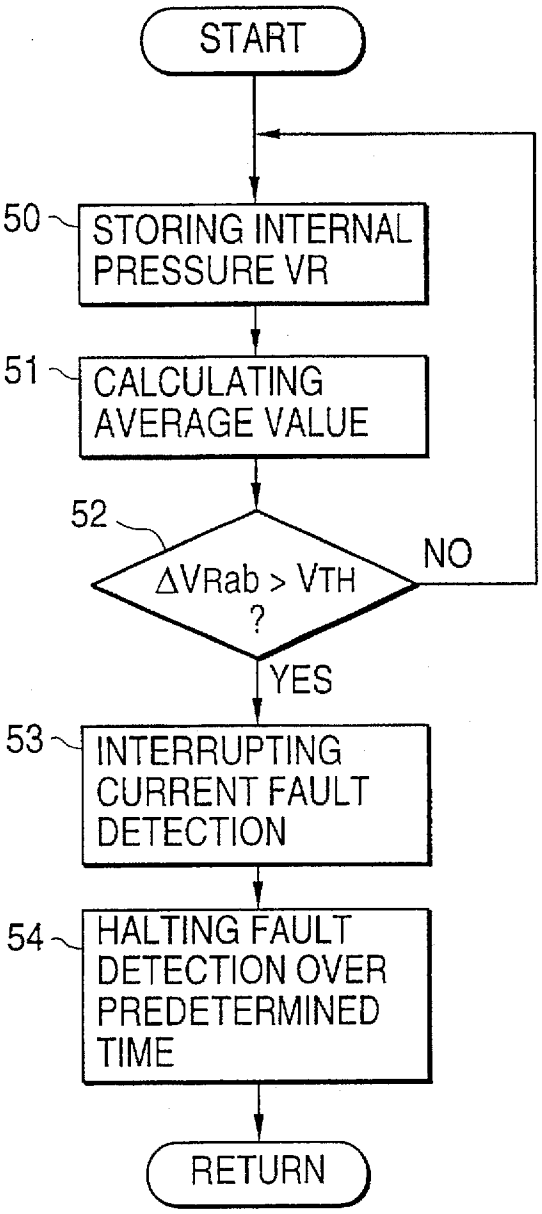
FIG. 8 is a flow chart showing the routine of interrupting the fault detecting routine.
Figures 9A, 9B, 9C, 9D:
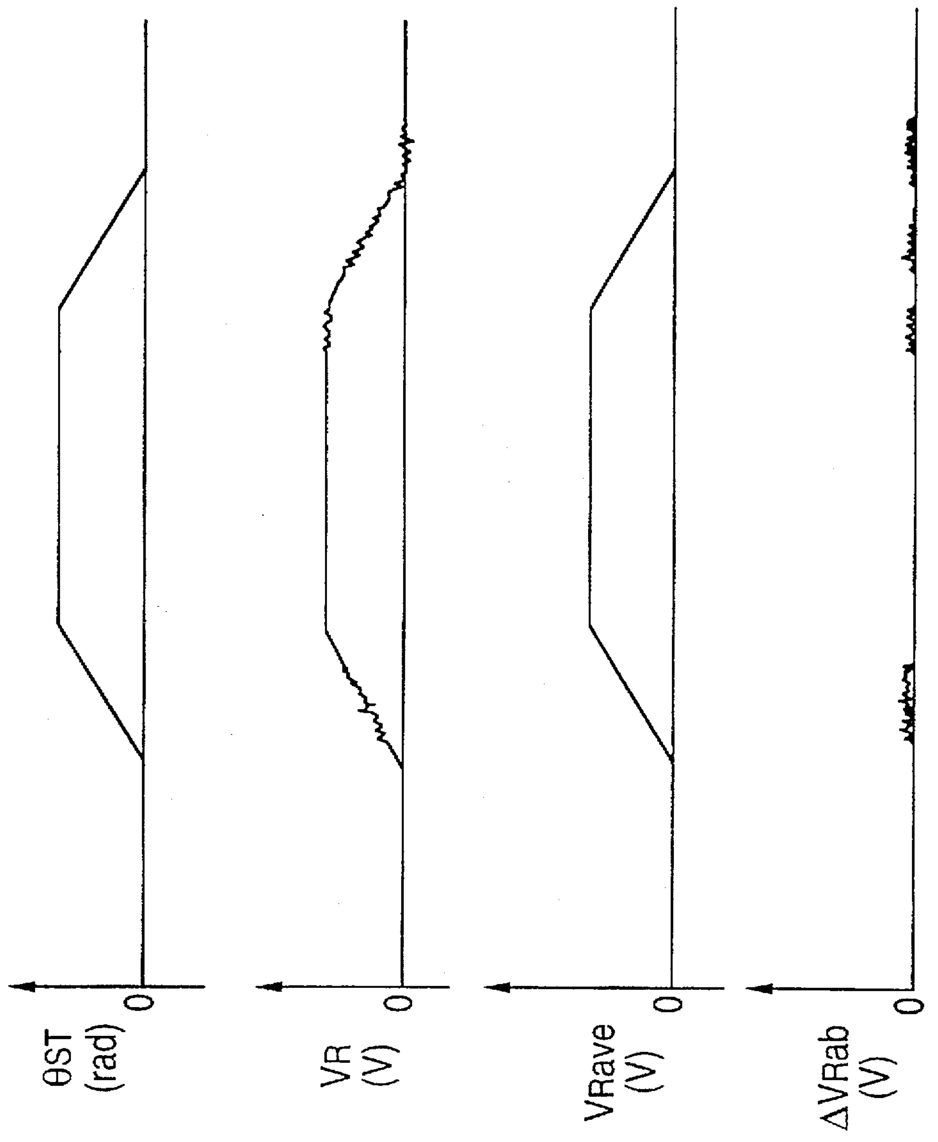
FIG. 9 is a time chart showing timewise variations of the steering angle during turning of the vehicle and parameters related to the fault detection.

The ECU 20 also executes an interruption control subroutine, as shown in the flow chart of FIG. 8 and the graph of FIG. 9, at a predetermined time interval (25 ms in this embodiment), concurrently with the fault detecting process as described above.

Upon start of this subroutine, the ECU 20 initially reads the output of the pressure sensor 17, which is converted into digital signal and stored as internal pressure signal VR in step S50. In the next step S51, the ECU 20 calculates the current average value VRave(N) of the internal pressure signal VR according to the following equation:

$$VRave(n)=K\cdot VRave(n-1)+(1-K)\cdot VR$$

where, VRave(n−1) is the average value obtained in the last control cycle, and K is an allotted filter constant (0.938 in the present embodiment).

Subsequently, the ECU 20 determines in step S52 whether the absolute value ΔVRab (|VRave(n)−VR|) of a deviation of the internal pressure signal VR from the average value VRave(n) is greater than a predetermined threshold VTH or not. If a negative decision (NO) is obtained in step S52, the ECU 20 returns to the start point of this subroutine, and repeats the following steps.

If an affirmative decision (YES) is obtained in step S52, on the other hand, the ECU 20 interrupts the currently implemented subroutine for detecting faults of the evaporative emission control system in step S53, and halts the subsequent fault detection over a predetermined period of time in step S54.

Referring next to the graph of FIG. 9, there will be explained the reason why an error in the fault detection can be avoided by implementing the subroutine as described above. If the running vehicle is accelerated or decelerated, or turned around while the fuel has a high liquid level in the fuel tank 5, for example, immediately after fueling, the fuel may enter or intrude into the pressure detecting port 5*b* due to incline of the liquid level of the fuel. Namely, the amount of the fuel entering the pressure detecting port 5*b* increases with a result of an increase in the level of the internal pressure signal VR as shown in FIG. 9(*b*), as the rate of acceleration or deceleration G of the vehicle increases, or the steering angle θst of the steering wheel increases or decreases from the neutral position (0 degree) as shown in FIG. 9(*a*). In this case, however, the level of the internal pressure signal VR increases with minute fluctuations as shown in FIG. 9(*b*) due to ruffling of the fuel liquid level during running of the vehicle. This is because the internal pressure signal level VR increases at the moments when the fuel liquid level is elevated, and decreases at the moments when the fuel liquid level is lowered. Thus, the frequency of the fluctuations of the internal pressure signal level VR coincides with that of the ruffling of the fuel in the fuel tank 5.

On the other hand, the average value VRave(n) of the internal pressure VR varies smoothly due to filtering, and thus increases without accompanying the minute fluctuations as described above, as shown in FIG. 9(*c*). Accordingly, the absolute value ΔVRab of the deviation of the internal pressure signal VR as shown in FIG. 9(*d*) indicates the presence of the above fluctuations. It is therefore possible to make a judgement as to whether the fuel has entered the pressure detecting port 5*b* or not, by determining whether the absolute value ΔVRab exceeds the threshold VTH or not. In the case where the increase in the internal pressure VR is caused by the leak in the system, the air flow from the leak portion into the fuel tank takes place at a slow rate, whereby the absolute value ΔVRab of the deviation is made substantially equal to zero.

While the preferred embodiment of the present invention has been described in detail by way of example, it is to be understood that the present invention is by no means limited to the details of the illustrated embodiment. While the purge solenoid valve is installed halfway in the purge path in the illustrated embodiment, for example, the purge solenoid valve may be provided at the purge port of the intake manifold so that leaks can be detected throughout the entire length of the purge path. Further, the pressure sensor may be directly attached to the upper surface of the fuel tank, though the pressure sensor is connected to the fuel tank through the internal pressure feed path in the illustrated embodiment. Moreover, the structure of the control system and the control processes or routines implemented by the system may be modified without departing from the principle of the present invention.

What is claimed is:

1. A fault diagnostic apparatus for detecting faults of a fuel evaporative emission control system for inhibiting a fuel evaporative emission from exhausting, the control system including a fuel evaporative emission flow path for drawing the fuel evaporative emission in a fuel tank into a suction passage of an engine, comprising:

path closure means for closing the flow path such that a vacuum is held in said fuel tank, said path closure means being provided in said fuel evaporative emission slow path;

internal pressure detecting means for detecting a level of internal pressure in said fuel tank;

leak detecting means for detecting a leak in said fuel evaporative emission flow path;

average calculating means for calculating an average value of a plurality of detected levels of the internal pressure obtained by said internal pressure detecting means within a predetermined period of time;

comparing means for calculating a deviation between each of said detected levels obtained by said internal pressure detecting means and said average value and for comparing the calculated deviation to a predetermined threshold; and detection interrupting means for interrupting leak detection by said leak detecting means based upon said comparison by said comparing means.

2. A fault diagnostic apparatus as defined in claim 1, wherein said comparing means calculates an absolute value of a deviation of each of said detected levels of the internal pressure from said average value.

3. A fault diagnostic apparatus as defined in claim 2, wherein said comparing means compares said absolute value of the deviation with the predetermined threshold and said detection interruption means interrupts leak detection upon the absolute value of the deviation being greater than the predetermined threshold.

4. A fault diagnostic apparatus as defined in claim 1, wherein said leak detecting means determines that the leak is present in said fuel evaporative emission flow path when a rate of increase of the detected levels of the internal pressure exceeds a predetermined threshold.

5. A fault diagnostic apparatus as defined in claim 4, wherein said rate of increase of the detected levels is determined on the basis of a variation in the internal pressure within a predetermined period of time.

6. A fault diagnostic apparatus as defined in claim 4, wherein said rate of increase of the detected levels is determined on the basis of a period of time required to achieve a predetermined amount of variation in the internal pressure.

7. A fault diagnostic apparatus as defined in claim 1, wherein said average calculating means repeatedly calculates the average value at predetermined time intervals.

8. A fault diagnostic apparatus as defined in claim 1, further comprising:

fuel evaporative emission adsorbing means for adsorbing the fuel evaporative emission, said fuel evaporative emission adsorbing means being provided in said fuel evaporative emission flow path.

9. The fault diagnostic apparatus of claim 1, wherein the average calculating means calculates a current average value (VRave(n)) from a previous average value (VRave (n−1)) from the following equation:

$$VRave(n)=k\cdot VRave(n-1)+(1-k)\cdot VR,$$

wherein k is a predetermined constant and VR is the detected level of internal pressure detected by the internal pressure detecting means.

10. A fault diagnostic method for detecting faults of a fuel evaporative emission control system in which a fuel evaporative emission in a fuel tank is sucked into a suction passage of an engine via a fuel evaporative emission flow path to inhibit the fuel evaporative emission from exhausting, the method comprising:

closing the fuel evaporative emission flow path such that a vacuum is held in said fuel tank;

detecting a level of internal pressure in said fuel tank;

detecting a leak in said fuel evaporative emission path;

calculating an average value of a plurality of detected levels of the internal pressure obtained by said internal pressure detecting step within a predetermined period of time;

calculating a deviation between each of said detected levels obtained by said internal pressure detecting step and said average value;

comparing the calculated deviation to a predetermined threshold; and interrupting said leak detecting step based upon said comparison of said comparing step.

11. The fault diagnostic method of claim 10, wherein said comparing step includes a sub-step of calculating an absolute value of a deviation of each of said detected levels of the internal pressure from said average value.

12. The fault diagnostic method of claim 11, wherein said comparing step further includes a sub-step of comparing said absolute value of the deviation with the predetermined threshold and said interruption occurs upon the absolute value of the deviation being greater than the predetermined threshold.

13. The fault diagnostic method of claim 10, wherein said leak detecting step determines that the leak is present in said fuel evaporative emission flow path when a rate of increase of the detected levels obtained by said internal pressure detecting step exceeds a predetermined threshold.

14. The fault diagnostic method of claim 13, wherein said rate of increase of the detected levels is determined on the basis of a variation in the internal pressure within a predetermined period of time.

15. The fault diagnostic method of claim 13, wherein said rate of increase of the detected levels is determined on the basis of a period of time required to achieve a predetermined amount of variation in the internal pressure.

16. The fault diagnostic method of claim 10, wherein said average calculating step repeatedly calculates the average value at predetermined time intervals.

17. The fault diagnostic method of claim 10, wherein said closing step includes a sub-step of increasing the internal pressure of the fuel tank for a predetermined period of time before the vacuum is held in the fuel tank.

18. The fault diagnostic method of claim 10, wherein calculating of an average value includes calculating a current average value (VRave (n)) from a previous average value (VRave(n−1)) from the following equation:

$$VRave(n)=k\cdot VRave(n-1)+(1-k)\cdot VR,$$

wherein k is a predetermined constant and VR is the detected level of internal pressure in said fuel tank.

19. A fault diagnostic apparatus for detecting faults of a fuel evaporative emission control system for inhibiting a fuel evaporative emission from exhausting, the control system including a fuel evaporative emission flow path for drawing the fuel evaporative emission in a fuel tank into a suction passage of an engine, comprising:

a path closing unit which closes said flow path such that a vacuum is held in said fuel tank, said path closing unit provided in said fuel evaporative emission flow path;

an internal pressure detecting unit which detects a level of internal pressure in said fuel tank;

a leak detecting unit which detects a leak in said fuel evaporative emission flow path;

an average calculating unit which calculates an average value of a plurality of detected levels of the internal pressure obtained by said internal pressure detecting unit within a predetermined period of time;

a comparing unit which calculates a deviation between each of said detected levels obtained by the internal pressure detecting unit and said average value and which compares the calculated deviation to a predetermined threshold; and a detection interrupting unit which interrupts the leak detection by said leak detecting unit based upon said comparison by said comparing unit.

20. A fault diagnostic apparatus of claim 19, wherein said comparing unit calculates an absolute value of a deviation of each of said detected levels of the internal pressure from said average value.

21. A fault diagnostic apparatus of claim 20, wherein said comparing unit compares said absolute value of the deviation with the predetermined threshold and said detection interrupting unit interrupts leak detection upon the absolute value of the deviation being greater than the predetermined threshold.

22. A fault diagnostic apparatus of claim 19, wherein said leak detecting unit determines that the leak is present in said fuel evaporative emission flow path when a rate of increase of the detected levels of the internal pressure detecting unit exceeds a predetermined threshold.

23. A fault diagnostic apparatus as defined in claim 22, wherein said rate of increase of the detected levels is determined on the basis of a variation in the internal pressure within a predetermined period of time.

24. A fault diagnostic apparatus as defined in claim 22, wherein said rate of increase of the detected levels is determined on the basis of a period of time required to achieve a predetermined amount of variation in the internal pressure.

25. A fault diagnostic apparatus as defined in claim 19, wherein said average calculating means repeatedly calculates the average value at predetermined time intervals.

26. A fault diagnostic apparatus as defined in claim 19, further comprising:

a fuel evaporative emission adsorbing unit which adsorbs the fuel evaporative emission, said fuel evaporative emission adsorbing unit being provided in said fuel evaporative emission flow path.

27. The fault diagnostic apparatus of claim 17, wherein the average calculating unit calculates a current average value (VRave(n)) from a previous average value (VRave (n−1)) from the following equation:

$$VRave(n)=k\cdot VRave(n-1)+(1-k)\cdot VR,$$

wherein k is a predetermined constant and VR is the detected level of internal pressure detected by the internal pressure detecting unit.

* * * * *